(12) United States Patent
Namikawa et al.

(10) Patent No.: US 12,436,614 B2
(45) Date of Patent: Oct. 7, 2025

(54) CONTACT PRESSURE SENSOR, KNIT PRODUCT HAVING SAME, AND METHOD OF MANUFACTURING CONTACT PRESSURE SENSOR

(71) Applicants: Murata Machinery, Ltd., Kyoto (JP); SHIMA SEIKI MFG., LTD., Wakayama (JP)

(72) Inventors: Tetsuya Namikawa, Kyoto (JP); Shuichi Fukuhara, Kyoto (JP); Tatsuya Kosui, Wakayama (JP); Takafumi Kamei, Wakayama (JP)

(73) Assignees: Murata Machinery, Ltd., Kyoto (JP); Shima Seiki Mfg., Ltd., Wakayama (JP)

( * ) Notice: Subject to any disclaimer, the term of this patent is extended or adjusted under 35 U.S.C. 154(b) by 733 days.

(21) Appl. No.: 17/779,798

(22) PCT Filed: Nov. 27, 2020

(86) PCT No.: PCT/JP2020/044331
§ 371 (c)(1),
(2) Date: May 25, 2022

(87) PCT Pub. No.: WO2021/107131
PCT Pub. Date: Jun. 3, 2021

(65) Prior Publication Data
US 2022/0413610 A1    Dec. 29, 2022

(51) Int. Cl.
*G06F 3/01*    (2006.01)
*D04B 1/28*    (2006.01)
*G01L 1/22*    (2006.01)

(52) U.S. Cl.
CPC ............... *G06F 3/014* (2013.01); *D04B 1/28* (2013.01); *G01L 1/2287* (2013.01)

(58) Field of Classification Search
CPC . G01L 1/20; G01L 1/22; G01L 1/2243; G01L 1/2287; G06F 3/014; D04B 1/28
See application file for complete search history.

(56) References Cited

U.S. PATENT DOCUMENTS

| 7,544,627 B2 | 6/2009 | Tao et al. |
| 8,925,393 B2 | 1/2015 | Cannard et al. |
| (Continued) | | |

FOREIGN PATENT DOCUMENTS

| CN | 103014978 A | 4/2013 |
| CN | 108035032 A | 5/2018 |
| (Continued) | | |

OTHER PUBLICATIONS

Notice of Reasons for Refusal dated May 30, 2023, of counterpart Japanese Patent Application No. 2021-561568, along with an English machine translation.

(Continued)

*Primary Examiner* — Paul M. West
(74) *Attorney, Agent, or Firm* — DLA Piper LLP (US)

(57) ABSTRACT

A contact pressure sensor detects a pressing force applied to a pressed body by a pressing body through a sensor portion disposed between the pressing body and the pressed body, wherein the sensor portion is formed of a knitting yarn including a carbon nanotube yarn, and the sensor portion includes a pressing body contact surface with which the pressing body comes into contact; a pressed body contact surface with which the pressed body comes into contact; knitting yarn intersecting portions formed between the pressing body contact surface and the pressed body contact surface; and void portions formed between the pressing body contact surface and the pressed body contact surface, the void portions being spaces in which the knitting yarn is not disposed.

18 Claims, 10 Drawing Sheets

(56) References Cited

U.S. PATENT DOCUMENTS

| | | | |
|---|---|---|---|
| 10,443,156 | B2 | 10/2019 | Yano |
| 11,913,146 | B1 * | 2/2024 | Fairchild ................. D03D 1/00 |
| 2006/0107762 | A1 | 5/2006 | Sandbach et al. |
| 2008/0307899 | A1 | 12/2008 | Von Lilienfeld-Toal et al. |
| 2014/0238151 | A1 | 8/2014 | Dunne et al. |
| 2017/0224280 | A1 | 8/2017 | Bozkurt et al. |

FOREIGN PATENT DOCUMENTS

| | | |
|---|---|---|
| JP | 7-109637 A | 4/1995 |
| JP | 2006-515071 A | 5/2006 |
| JP | 2006-225797 A | 8/2006 |
| JP | 2009-516839 A | 4/2009 |
| JP | 2010-14694 A | 1/2010 |
| JP | 2012-229502 A | 11/2012 |
| JP | 3183657 U | 5/2013 |
| JP | 2013-163630 A | 8/2013 |
| KR | 101722064 B1 | 3/2017 |
| WO | 2006/068194 A1 | 6/2006 |
| WO | 2015/001669 A1 | 1/2015 |

OTHER PUBLICATIONS

International Search Report dated Dec. 22, 2020, of corresponding International Application No. PCT/JP2020/044331, along with an English translation.

An English translation of the International Preliminary Report on Patentability and Written Opinion dated Jun. 9, 2022, of counterpart PCT International Application No. PCT/JP2020/044331.

Extended European Search Report dated Nov. 29, 2023, of counterpart European Patent Application No. 20891680.9.

* cited by examiner

CONTACT PRESSURE SENSOR, KNIT PRODUCT HAVING SAME, AND METHOD OF MANUFACTURING CONTACT PRESSURE SENSOR

TECHNICAL FIELD

This disclosure relates to a contact pressure sensor, a knit product having the same, and a method of manufacturing the contact pressure sensor.

BACKGROUND

As described in Japanese Unexamined Patent Publication No. 2012-229502, there is known an operation fingertip of a capacitive touch panel in which a protruding knitted fabric portion is formed by knitting a knitted stitch of a wale direction using a conductive yarn in addition to a fingertip knitted in a tubular shape using a non-conductive yarn. That fingertip is applied, for example, to the fingertip of a portion of gloves. In addition, in the gloves described in Japanese Unexamined Patent Publication No. 2012-229502, a fingertip portion of a fingertip for a thumb is knitted using a conductive yarn separately from a fingertip in which a protruding knitted fabric portion is formed.

As described in Japanese Translation of International Application No. 2009-516839, a pressure sensor that can be incorporated into a fiber product is known. The pressure sensor comprises a multilayer yarn having a pressure-sensitive layer with a pressure-dependent electrical resistance and an electrically conductive layer in contact with the pressure-sensitive layer. In that pressure sensor, the pressure causes an elastic compression of the pressure-sensitive coating (pressure-sensitive layer) in the crossing region in which the two multilayer threads cross and come into contact with one another. As the applied pressure increases, a resistance to current flow across the pressure sensitive coating between the two multilayer yarns is generated. By measuring the electrical resistance, the pressure can be measured.

The fingertip described in Japanese Unexamined Patent Publication No. 2012-229502 is a knit product used for a capacitive touch panel. In that fingertip, the pressing force applied to the finger cannot be detected. Although the pressure sensor described in Japanese Translation of International Application No. 2009-516839 can measure the pressure, the pressure measurement accuracy is not sufficient. In addition, the structure is complicated and the manufacturing is time-consuming.

The load sensing fiber forming the knitted item described in Japanese Unexamined Patent Publication No. 2010-14694 has a configuration capable of detecting a pressure change by itself. In other words, the load detection fiber has a structure that detects a pressure change based on the degree of collapse of the yarn itself. Although it is possible to detect a change in pressure by knitting such a load detection fiber in any shape, the load detection fiber has a complicated structure, which is disadvantageous in terms of handling and cost.

It could therefore be helpful to provide a contact pressure sensor, a knit product, and a method of manufacturing a contact pressure sensor that can more accurately detect a pressing force applied to a pressed body by a pressing body.

SUMMARY

A contact pressure sensor detects a pressing force applied by a pressing body to a pressed body through a sensor portion disposed between the pressing body and the pressed body, wherein the sensor portion is formed of a knitting yarn including a carbon nanotube yarn, and the sensor portion has a pressing body contact surface with which the pressing body comes into contact, a pressed body contact surface with which the pressed body comes into contact, knitting yarn intersecting portions formed between the pressing body contact surface and the pressed body contact surface, and void portions which are spaces formed between the pressing body contact surface and the pressed body contact surface and in which the knitting yarn is not disposed.

According to this contact pressure sensor, knitting yarn intersecting portions, which are portions where knitting yarns intersect, and void portions, which are spaces in which knitting yarns are not disposed, are formed between the pressing body contact surface and the pressed body contact surface. When the pressing body comes into contact with the pressing body contact surface of the sensor portion in a state where the pressed body contact surface is in contact with the pressed body, the void portions initially present are gradually reduced. In some instances (but not always), the knitting yarn is crushed such that the cross section of the knitting yarn deforms. As described above, between the pressing body contact surface and the pressed body contact surface, the contact conformation between the knitting yarns changes between the state in which the void portions are present and the state in which the knitting yarns are in contact with each other without the void portions. Accordingly, the change amount of the contact resistance in the carbon nanotube yarn is large. By detecting the contact resistance in the sensor portion using the contact pressure sensor, the pressing force applied to the pressed body by the pressing body can be detected more accurately. The weight of the sensor portion can be reduced.

The sensor portion may be configured to change a contact resistance in the sensor portion by changing a contact area between the knitting yarns in response to a change in the pressing force in the knitting yarn intersecting portions when the sensor portion receives a force from a direction intersecting both the course direction and the wale direction or when the received force is released. When the contact area changes between the knitting yarns including the carbon nanotube yarn, the change is reliably reflected in the contact resistance in the sensor portion. Therefore, it is possible to reliably detect a change in the pressing force in the knitting yarn intersecting portions.

A first end portion and a second end portion, which are both ends of the sensor portion in the course direction, may each include a terminal including a knitting yarn derived from a plurality of courses of the sensor portion. According to this configuration, even when the pressing force is applied to the vicinity of any course of the sensor portion including a plurality of courses, it is possible to detect a change in the contact resistance corresponding to the pressing force. In other words, assuming that a certain pressing force is applied, it is possible to reduce an error due to a position such that the contact resistance changes when the position changes in the sensor portion.

The contact pressure sensor may further include a connecting portion that connects the terminal including a knitting yarn derived from a plurality of courses to a wire forming a part of a resistance detection circuit for detecting contact resistance in the sensor portion. According to this configuration, the contact resistance can be detected via the wire. By adjusting the position or mounting manner (or mounting structure) of the wire, the contact pressure sensor can be applied to all applications, tools, devices and the like.

The wire may be a knitted fabric wire formed by knitting a conductive yarn having a smaller change in resistance value than that of the knitting yarn. According to this configuration, a change in contact resistance occurring in the sensor portion can be detected with high sensitivity via the knitted fabric wire.

A knit product includes any one of the contact pressure sensors described above, and a knit knitted using a non-conductive yarn and on which the sensor portion is integrally knitted. According to the knit product, for example, when a user (wearer of the knit product) presses a part of the body against some part of an object, the pressing force can be detected. The part of the body means a part corresponding to (facing) the position where the sensor portion is knitted in the body of the wearer of the knit product. This part of the body corresponds to the pressing body. The certain part of the object is a part having a shape or hardness enough to receive the pressing force, and corresponds to a pressed body.

A method of manufacturing a contact pressure sensor that detects a pressing force applied by a pressing body to a pressed body through a sensor portion disposed between the pressing body and the pressed body includes a sensor portion knitting step of knitting the sensor portion using a knitting yarn including a carbon nanotube yarn, wherein the sensor portion knitting step includes forming a pressing body contact surface with which the pressing body comes into contact, a pressed body contact surface with which the pressed body comes into contact, knitting yarn intersecting portions between the pressing body contact surface and the pressed body contact surface, and void portions that are spaces between the pressing body contact surface and the pressed body contact surface and in which the knitting yarn is not disposed. The sensor portion knitting step forms knitting yarn intersecting portions, which are portions where the knitting yarns intersect, and void portions, which are spaces where the knitting yarn is not disposed, between the pressing body contact surface and the pressed body contact surface. Accordingly, as described above, the contact pressure sensor capable of more accurately detecting the pressing force applied to the pressed body by the pressing body may be manufactured.

The manufacturing method for the contact pressure sensor may further include a knitting yarn preparing step of preparing a knitting yarn including the carbon nanotube yarn before the sensor portion knitting step, wherein the knitting yarn preparing step includes a twisting step of twisting the carbon nanotube yarn and the water-soluble yarn, and a surface of the carbon nanotube yarn may be covered with the water-soluble yarn in the twisting step.

The method of manufacturing the contact pressure sensor may further include a water-soluble yarn removing step of washing the formed sensor portion with hot water after the sensor portion knitting step to dissolve and remove the water-soluble yarn from the sensor portion.

In the method, the water-soluble yarn may be water-soluble vinylon.

In the sensor portion knitting step, the sensor portion may be knitted such that a first end portion and a second end portion, which are both ends of the sensor portion in a course direction, each includes a terminal formed of the knitting yarn derived from a plurality of courses of the sensor portion. By the sensor portion knitting step, a terminal composed of a knitting yarn derived from a plurality of courses is formed. According to the contact pressure sensor manufactured in this manner, even when a pressing force is applied to the vicinity of any course of a sensor portion including a plurality of courses, it is possible to detect a change in the contact resistance corresponding to the pressing force.

The manufacturing method for the contact pressure sensor may further include a wire connection step of connecting the terminal of each of the first end portion and the second end portion formed in the sensor portion to a wire forming a part of a resistance detection circuit for detecting contact resistance in the sensor portion. In the wire connection process, the terminal is connected to the wire. According to the contact pressure sensor manufactured as described above, the contact resistance may be detected through the wire. By adjusting the position or attachment of the wire, the contact pressure sensor can be applied to any application, tool, device and the like.

The pressing force applied to the pressed body by the pressing body can thus be detected more accurately.

REFERENCE SIGNS LIST

Figure 1:
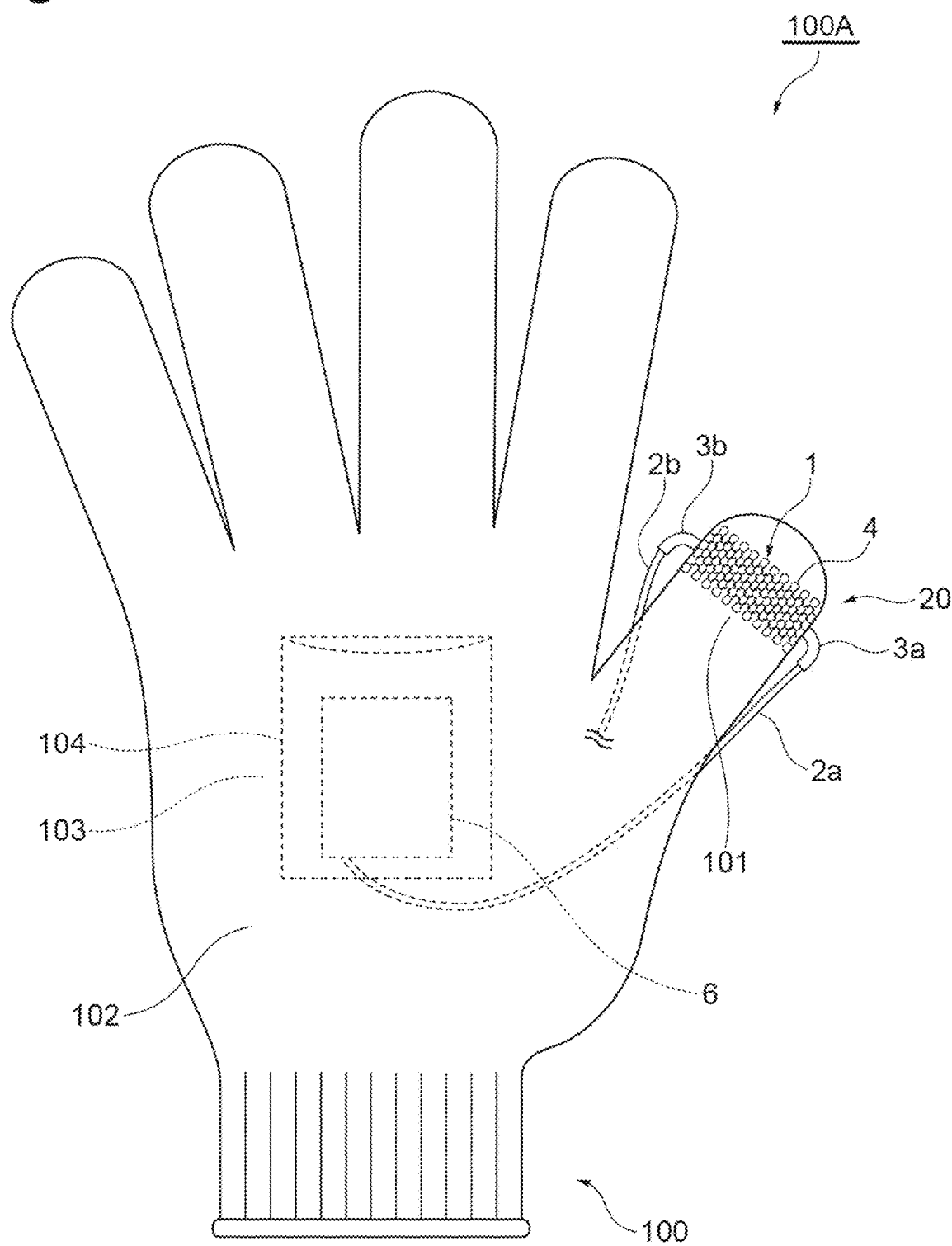
FIG. 1 illustrates a contact pressure sensor and a knit product according to an example.

1 . . . sensor portion, 1a . . . first end portion, 1b . . . second end portion, 1c . . . knitted fabric portion, 1m . . . pressing contact surface, 1n . . . pressed contact surface, 2a . . . first wire, 2b . . . second wire, 3a . . . first connecting portion, 3b . . . second connecting portion, 4 . . . knitting yarn, 4A, 4B . . . knitting yarn, 5 . . . knitting yarn intersecting portion, 6 . . . detection device, 7 . . . amplifier, 8 . . . control unit, 9 . . . resistance, 10a . . . first terminal, 10b . . . second terminal, 20 . . . contact pressure sensor, 21 . . . knitting yarn, 22 . . . water-soluble yarn, 23 . . . water-soluble yarn, 30a . . . knitted fabric wire, 30b . . . knitted fabric wire, 40a . . . first connecting portion, 40b . . . second connecting portion, 100 . . . glove (knit), 100A . . . glove (knit product) with contact pressure sensor, 101 . . . thumb underside portion, D1 . . . course direction, D2 . . . wale direction, M . . . finger (pressing body), N . . . pressed body, S . . . void portion.

DETAILED DESCRIPTION

Hereinafter, examples of our sensors, knit products and methods will be described with reference to the drawings. In the description of the drawings, the same elements are denoted by the same reference numerals, and redundant description is omitted.

A basic configuration of the contact pressure sensor 20 according to an example will be described with reference to FIGS. 1 and 2. The contact pressure sensor 20 is attached to a knit knitted with, for example, a non-conductive yarn, and is a sensor that detects a pressing force applied to a pressed body by a part (pressing body) of a user wearing the knit. For example, as shown in FIG. 1, the contact pressure sensor 20 is attached to a glove 100 that is a knit knitted with a non-conductive yarn. FIG. 1 is a diagram showing a glove 100 viewed from the palm portion 102 side. The glove 100 is a knit by plain knitting, for example. The contact pressure sensor 20 includes a sensor portion 1 which is a knitted fabric knitted with a conductive yarn. The sensor portion 1 is integrally knitted with, for example, a thumb underside portion 101 (portion corresponding to the fingerprint side) of the glove 100. The portion 1 in which the sensor glove 100 is integrally knitted and the contact pressure sensor 20 constitute a glove (knit product) 100A with a contact pressure sensor, which is a type of a wearable sensor.

Figure 2:
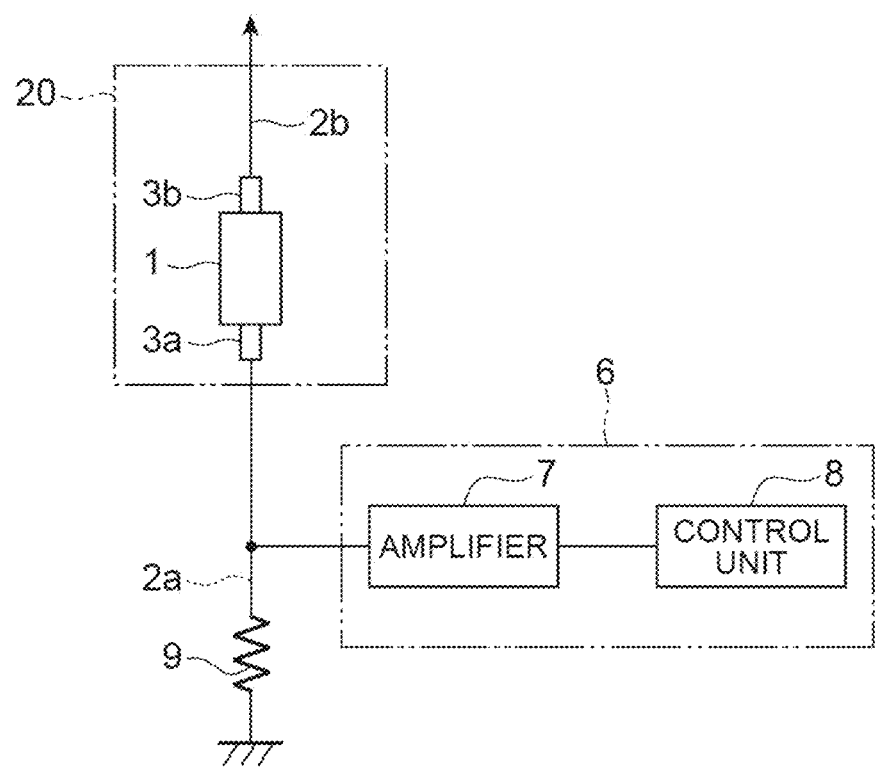
FIG. 2 is a diagram illustrating a contact pressure sensor and a resistance detection circuit including wires according to an example.

As shown in FIGS. 1 and 2, the contact pressure sensor 20 includes a sensor portion 1, a first wire 2a and a second wire 2b, which form a part of a resistance detection circuit (see FIG. 2) that detects the contact resistance in the sensor portion 1, and a first connecting portion 3a and a second connecting portion 3b, which connect the sensor portion 1 to the first wire 2a and the second wire 2b, respectively. The resistance detection circuit includes an amplifier 7 and a control unit 8 electrically connected to the first wire 2a, and a resistance 9 provided between the connection point of the amplifier 7 with respect to the first wire 2a and the ground in the circuit. The amplifier 7 amplifies a current value indicating the value of the contact resistance in the sensor portion 1. The amplifier 7 may be omitted depending on conditions. The control unit 8 calculates the resistance value of the contact resistance in the sensor amplifier 7 based on the current value output from the portion 1. In the resistance detection circuit, the positions of the sensor portion 1 and resistance 9 may be reversed from those in the example of FIG. 2.

The glove 100A with a contact pressure sensor may have a detection device 6 mounted on the back portion 103 of glove 100 and including an amplifier 7 and a control unit 8. For example, the housing of the detection device 6 including an amplifier 7 and a control unit 8 may be housed in a storage pocket 104 provided in the back portion 103. In this example, the first wire 2a and the second wire 2b are disposed at appropriate positions on the back portion 103 side, and the wire 2a is electrically connected to the amplifier 7 and the control unit 8. The wire 2b is connected to a power source (such as a battery) (not shown). The amplifier 7 and the control unit 8 or the detection device 6 may not be mounted on the glove 100. For example, a transmitter may be attached to the portion 1 or other part that transmits a signal indicative of the resistance value of the contact resistance in the sensor glove 100. The resistance value of the contact resistance in the sensor portion 1 may be calculated by a receiver and a control unit 8 provided at a location away from the sensor portion 1. In this example, the resistance 9 is provided between the connection point of the amplifier 7 and the ground in the circuit as a separate member from the detection device 6, but the resistance 9 may be configured as a part of the detection device 6. In this example, either of a wired means and a wireless means can be adopted as a means for transmitting the detection value by the detection device 6 to the outside.

The sensor portion 1 is formed of a knitting yarn 4 including carbon nanotube yarn (CNT yarn) which is spun yarn formed of carbon nanotube (CNT). In other words, the sensor portion 1 is knitted using the knitting yarn 4 including the CNT yarn. The shape of the sensor portion 1 in a plan view is not particularly limited, but is, for example, rectangular. The shape of the sensor portion 1 may be a rectangular shape, or may be a square shape. The shape of the sensor portion 1 may be a shape other than a rectangular shape. The size of the sensor portion 1 may be appropriately changed or set according to the size of the pressing body. In a glove 100A with a contact pressure sensor, the size of the sensor portion 1 is set to be equal to or larger than the thumb underside of the user. The size of the sensor portion 1 may be smaller than that of the thumb underside of the user, and may be disposed at the center of the thumb underside. The sensor portion 1 may be knitted on the thumb underside portion 101 of the fully cylindrically knitted glove 100, or only the portion corresponding to the thumb underside portion 101 of the glove 100 may be replaced with the sensor portion 1 made of the conductive yarn instead of the non-conductive yarn. That is, a part of the glove 100 (in this example, a part of a fingertip for a thumb or the like) may be formed of a knitted fabric made of a knitting yarn 4. Of course, depending on the application of the glove 100, the position of the sensor portion 1 may be displaced relative to the thumb underside portion 101. For example, in using the fingertip of the thumb, it is preferable to arrange the position of the sensor portion 1 on the fingertip side of the underside portion.

The knitting yarn 4 is, for example, a yarn made of a CNT yarn which is a conductive yarn. When the knitting yarn 4 is formed of the CNT yarn, the detection accuracy of the contact resistance, which will be described later, is enhanced, and the pressing force can be detected more accurately. The knitting yarn 4 may be, for example, a plied yarn obtained by twisting a plurality of (for example, three or six) CNT yarns. The knitting yarn 4 may be a single yarn made of one CNT yarn. The knitting yarn 4 may be a yarn made of only CNTs, but may be a yarn in which some other substances are mixed with CNTs. Other materials include, for example, polyester, cotton, nylon, wool and the like. In this example, the proportion occupied by CNTs is 50% or more, preferably 70% or more, more preferably 80% or more, and even more preferably 90% or more. Alternatively, the knitting yarn 4 may be a plied yarn twisted with another yarn other than the CNT yarn.

The CNT yarn can be produced, for example, by drawing out a CNT fiber group from a CNT forming substrate supported by a substrate supporting unit, introducing the CNT fiber group into a yarn producing unit, and twisting the CNT fiber group by a swirling flow of compressed air generated in the yarn producing unit. The CNT forming substrate is, for example, a carbon nanotube forest or a vertically aligned structure of CNTs. The CNT yarn produced in this manner has a high density because the CNT fibers are twisted in an unaggregated state in which the CNT fibers do not have a flat shape. The CNT yarn contains a group of highly oriented CNT fibers. The CNT yarn can be produced by, for example, the method described in International Publication 2015/001669. CNT yarn may be produced using other known production methods.

Figure 3:
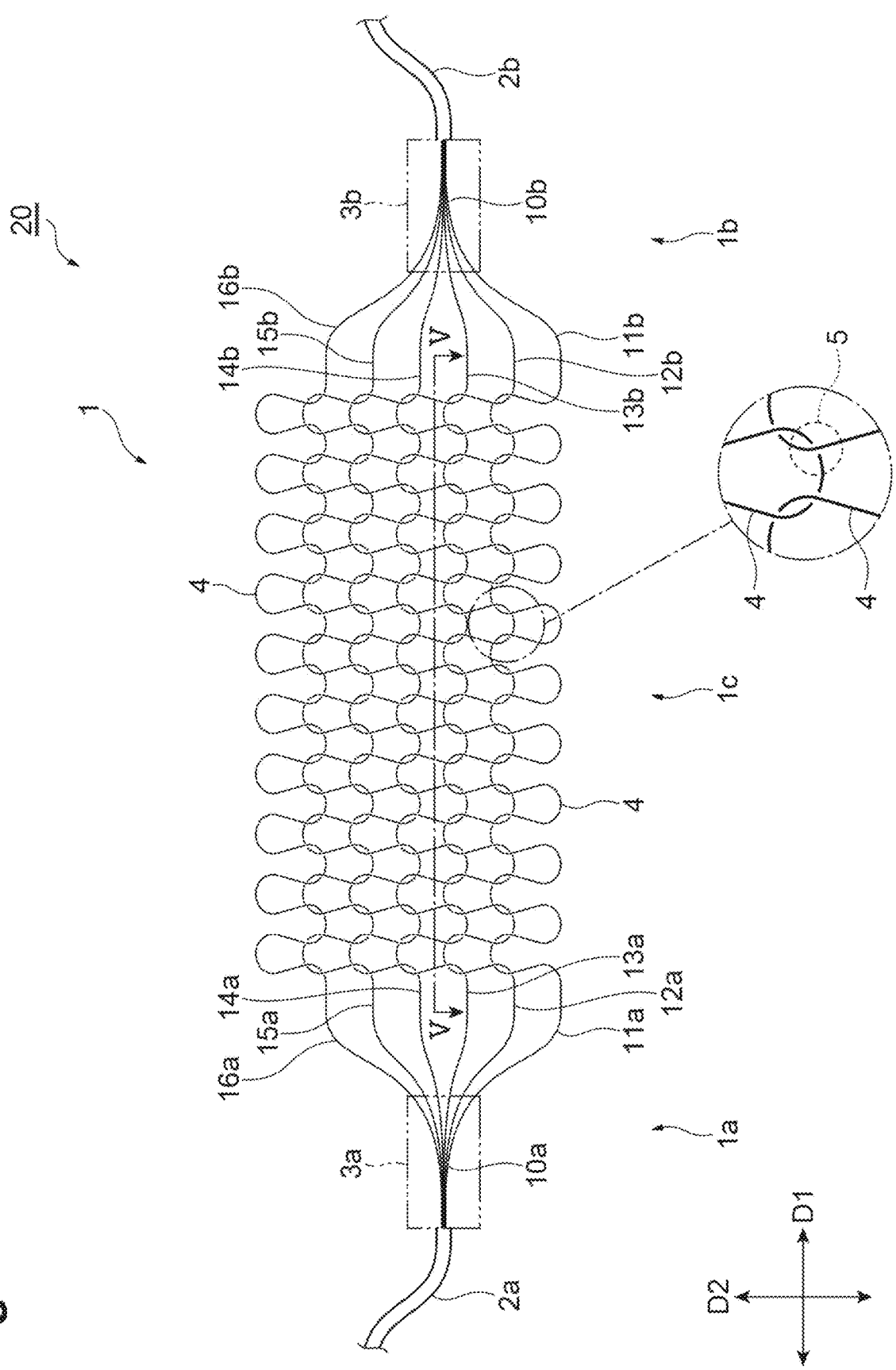
FIG. 3 is a diagram illustrating a connection structure between a terminal and a wire in a first end portion and a second end portion of a sensor portion.
Figure 4A:
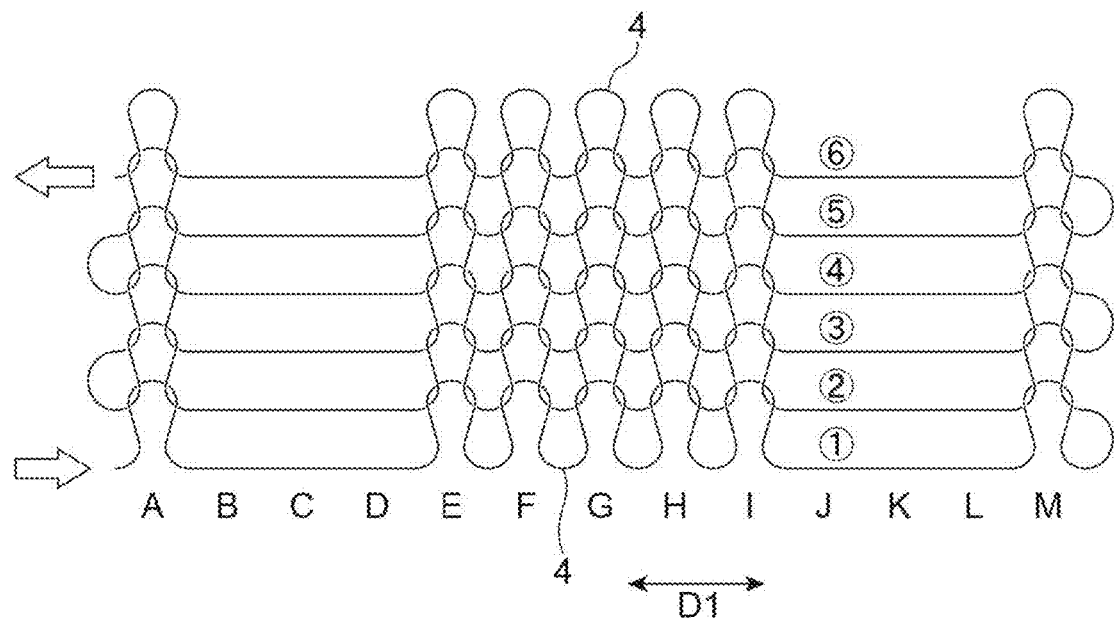
FIG. 4(a) is a diagram explaining a method of forming terminals in a sensor portion knitting step.

Subsequently, the contact pressure sensor 20 and the sensor portion 1 will be described in detail with reference to FIGS. 3 and 4(a)-4(b). As shown in FIG. 3, sensor portion 1 is a knitted fabric formed by weft knit. The sensor portion 1 includes a knitted fabric portion 1c formed by weft knit of a knitted fabric yarn 4, and a first end portion 1a and a second end portion 1b which are both ends of the knitted fabric portion 1c. The knitted fabric portion 1c has a course direction D1 and a wale direction D2. The first end portion 1a and the second end portion 1b are both ends of the knitted fabric portion 1c in the course direction D1, for example.

A first end portion 1a and a second end portion 1b, which are both ends of the sensor portion 1 in the course direction D1, include a first terminal 10a and a second terminal 10b, respectively, each of which is composed of a knitting yarn 4 derived from all courses of the sensor portion 1. In the example shown in FIG. 3, the knitted fabric portion 1c has a total of six courses. The first terminal 10a is composed of a first course yarn 11a, a second course yarn 12a, a third course yarn 13a, a fourth course yarn 14a, a fifth course yarn 15a, and a sixth course yarn 16a. These first to sixth course yarns 11a to 16a are bundled. The second terminal 10b is composed of a first course yarn 11b, a second course yarn 12b, a third course yarn 13b, a fourth course yarn 14b, a fifth course yarn 15b, and a sixth course yarn 16b, and these first to sixth course yarns 11b to 16b are bundled. Although FIG. 3 is a schematic diagram for easy understanding of the structure of the sensor yarn 4 formed by the knitting portion 1, the first to sixth course yarns 11a to 16a and the first to sixth course yarns 11b to 16b may be bundled at positions closer to both ends of the knitted fabric portion 1c.

A method of forming the knitted fabric portion 1c and the terminals 10a and 10b (sensor portion knitting step) will be described with reference to FIGS. 4(a) and 4(b). In FIG. 4(a), a circled number indicates a knitting course number. The sensor portion 1 is knitted using a known flat-knitting machine. First, the knitting needles are moved forward and backward by a carriage (not shown) while supplying the knitting yarn 4 to the knitting needles provided in parallel to the needle head in order from the yarn 4 course, and the knitting needles hook the knitting yarn 4 to form the knitted fabric portion 1c. In the first course, the knitting needles A, E to I, and M form knitted stitches, and let the knitting yarn 4 cross transversely without moving the knitting needles B to D and J to L. Thereafter, in the second course, the knitting needles M, I to E, and A form knitted stitches with the yarn feeding direction being reversed, and let the knitting yarn 4 cross transversely without moving the knitting needles L to J and D to B. The above knitting steps are repeated up to the sixth course, and then raveling prevention is performed to the knitted stitches of the knitting needles E to I. This raveling prevention may be performed by a known method, but may be performed using a knitting method called "bind-off" or using a special yarn, for example.

Figure 4B:
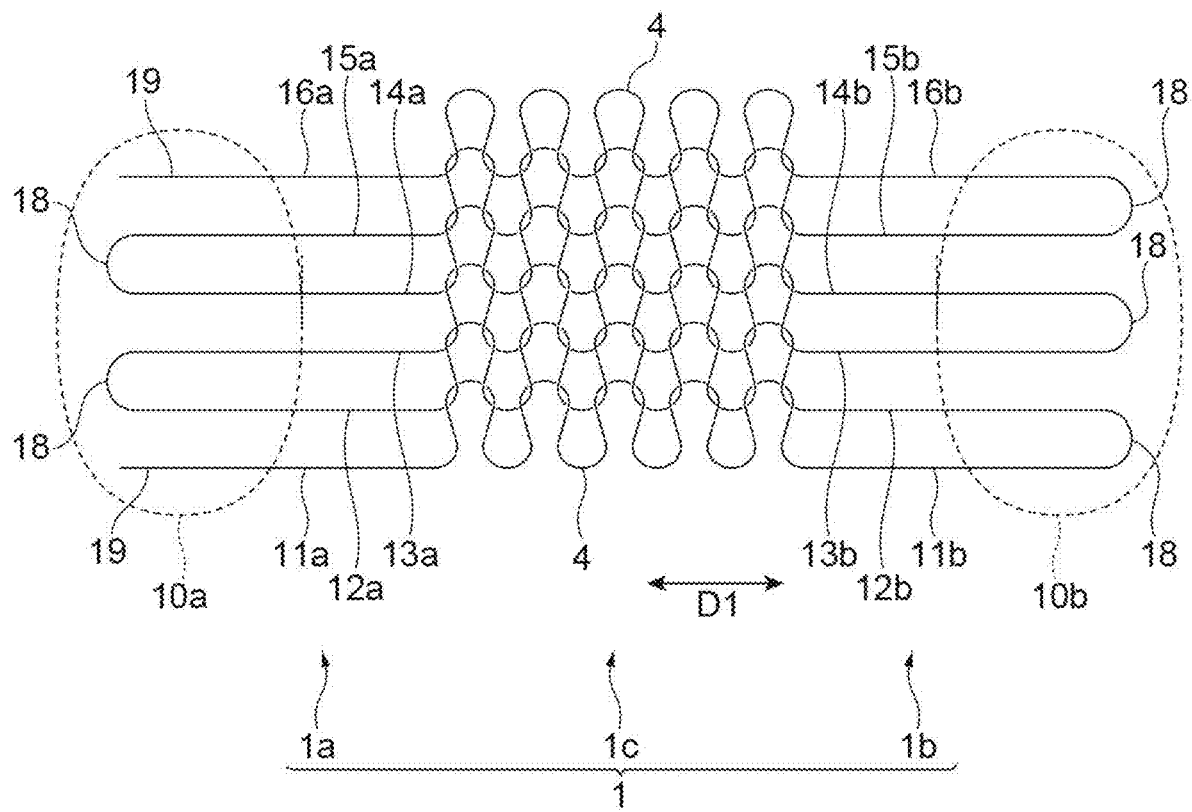
FIG. 4(b) is a diagram explaining the formed terminal and a connection method in a wire connection step.

With respect to the knitting needle A and M of the sixth course, by removing the locked knitted stitches from the knitting needle, the connection of all the knitted stitches arranged in the longitudinal direction (wale direction D2) is released, and a whisker-shaped first terminal 10a and a second terminal 10b are formed as shown in FIG. 4(b). The step of removing the knitted stitches from the knitting needle A and M may be performed every course or every several courses. The knitting method for forming the knitted fabric portion 1c and the terminals 10a and 10b may be adopted from various knitting methods, and is not limited to the knitting method described above. Although an example of a knitting method that can be easily understood has been described above, a more complicated knitting method may be adopted. In the example shown in FIG. 4(b), a plurality of U-shaped turning portion 18 are formed, and yarn end portions 19 and 19 are formed at both ends of the knitting yarn 4, but the terminal may be connected to the wire while the turning portion 18 is included, or the terminal may be connected to the wire in a state where the knitting yarn 4 is cut and the turning portion 18 is not included.

Referring again to FIG. 3, the first connecting portion 3a and the second connecting portion 3b that connect the first terminal 10a and the second terminal 10b, respectively, to the first wire 2a and the second wire 2b that form a part of the resistance detection circuit (see FIG. 2) can be realized by any means that enables these electrical connections. For example, the first connecting portion 3a and the second connecting portion 3b may have a caulking structure or a crimping structure using a metallic connecting member. The first terminal 10a and the second terminal 10b may be connected to the first wire 2a and the second wire 2b by soldering. In this example, it is preferable that the first connecting portion 3a and the second connecting portion 3b have a soldered portion, and a primer layer having strong affinity with the CNT and the solder is provided in the soldered portion.

Figure 5A:
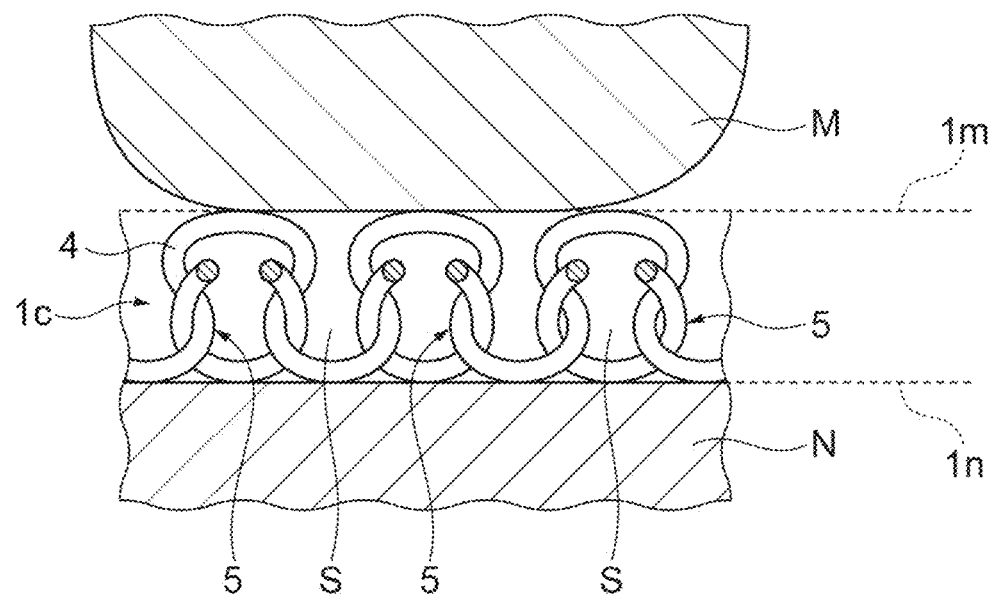
FIG. 5(a) is a cross-sectional view taken along line V-V in FIG. 3.
Figure 5B:
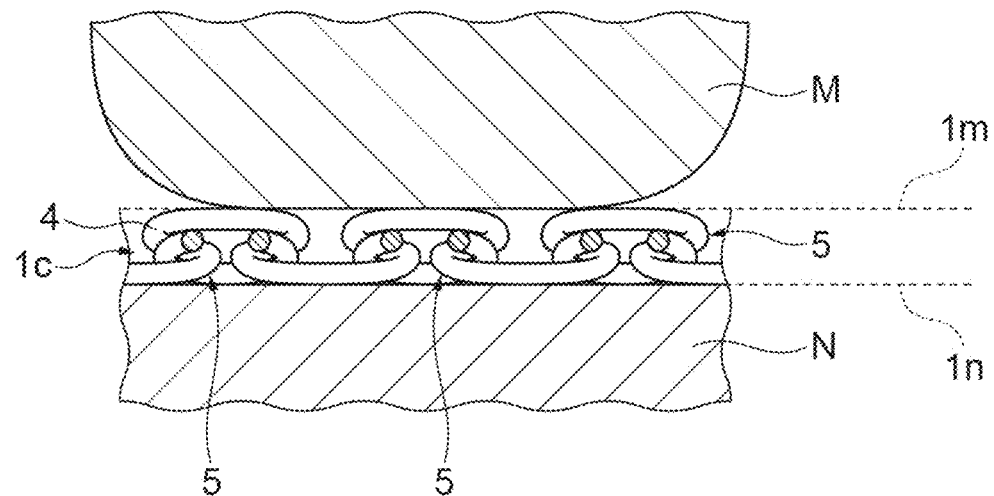
FIG. 5(b) is a diagram showing an example of deformation of the knitted structure when the knitted structure of FIG. 5(a) receives a force.

Next, the knitting structure of the sensor portion 1 made of the CNT yarn will be described. FIG. 5(a) is a cross-sectional view taken along the line V-V in FIG. 3, and FIG. 5(b) is a diagram illustrating an example of deformation of the knitted structure in FIG. 5(a) when the knitted structure receives a force. In these drawings, it is shown that a sensor portion 1 of a glove 100A with a contact pressure sensor is worn by a user, and a finger M (more specifically, a thumb) of the user acts as a pressing body to apply a pressing force to a pressed body N. The pressed body N is an object having a fixed shape or hardness that is pressed by finger M. As an example, the pressed body N may be a button or the like pressed by a thumb.

As illustrated in FIG. 5(a), the knitted fabric portion 1 of the sensor portion 1c includes a pressing body contact surface 1m with which the finger M comes into contact and a pressed body contact surface 1n with which the pressed body N comes into contact. The pressing body contact surface 1m is the front side of the sensor portion 1, and the pressed body contact surface 1n is the back side of the sensor portion 1. When the fingertip of the glove 100 is considered as a reference, the pressing body contact surface 1m is the back face positioned on the thumb side (fingerprint side), and the pressed body contact surface 1n is the front face exposed on the front side of the glove 100. The knitted fabric portion 1 of the sensor portion 1c includes a pressing body contact surface 1m, which is a first surface, and a pressed body contact surface 1n, which is a second surface opposite to the first surface. The knitted fabric portion 1 of the sensor portion 1c includes multiple (a plurality of) knitting yarn intersecting portions 5 formed between the pressing body contact surface 1m and the pressed body contact surface 1n, and multiple (a plurality of) void portions S which are spaces formed between the pressing body contact surface 1m and the pressed body contact surface 1n and in which the knitting yarn 4 is not disposed. The knitting yarn intersecting portion 5 is a portion where the knitting yarns 4 intersect. The void portions S are formed, for example, between one knitting yarn intersecting portion 5 and another adjacent knitting yarn intersecting portion 5 in the course direction D1. In a part of the knitting yarn intersecting portions 5, the knitting yarns 4 and the knitting yarns 4 are in contact with each other, while in another part of the knitting yarn intersecting portions 5, the knitting yarns 4 and the knitting yarns 4 are not in contact with each other. When the knitting yarns 4 and the knitting yarns 4 are not in contact with each other in the knitting yarn intersecting portions 5, the space between the knitting yarns 4 and the knitting yarns 4 are also void portions S.

When the knitted fabric portion 1 of the sensor portion 1c receives a force in the thickness direction of the knitted fabric portion 1c, that is, in the direction perpendicular to both the course direction D1 and the wale direction D2, the contact areas between the knitted yarns intersecting portions 5 increase in response to an increase in the pressing force applied to the knitted fabric yarn 4. As a result, the contact resistance in the knitted fabric portion 1c decreases. As shown in FIG. 5(b), when the knitted fabric portion 1c receives a pressing force, the thicknesses of the knitted fabric portion 1c, that is, the distances between the pressing body contact surface 1m and the pressed body contact surface 1n, are reduced. At this time, the volume of the void portions S decreases. The contact areas of the knitting yarns 4 are larger than those in the natural state shown in FIG. 5(a). In the knitted fabric portion 1 of the sensor portion 1c, the contact resistance in the knitted fabric portion 1c increases as the contact areas between the knitted yarns 4 decrease in response to the decrease (disappearance) of the pressing force in the knitted yarn intersecting portion 5 when the force received in the thickness direction of the knitted fabric portions 1c is released. At this time, the volume of the void portions S increases and returns to the original natural state shown in FIG. 5(a). As described above, the sensor portion 1 is disposed between the finger M and the pressed body N, and is configured such that the contact resistance in the sensor portion 1 changes as the contact areas between the knitting yarn 4 change in response to a change in the pressing force in the knitting yarn intersecting portions 5 when the pressing force is applied from the finger M to the pressed body N or when the pressing force is released.

A method of manufacturing a contact pressure sensor 20 is described. The sensor portion 1 is knitted using the knitting yarn 4 formed of the CNT yarn (sensor portion knitting step). In the sensor portion knitting step, the pressing body contact surface 1m, the pressed body contact surface 1n, the knitting yarn intersecting portions 5, and the void portions S described above are formed. The sensor portion knitting step is performed using, for example, a known flat knitting machine. In the sensor portion knitting step, as described with reference to FIG. 3, the sensor portion 1c is knitted so that the first end portion 1a and the second end portion 1b, which are both ends of the knitted fabric portion 1c in the course direction D1, respectively include the first terminal 10a and the second terminal 10b composed of the knitting yarns 4 coming out from all courses of the knitted fabric portion 1.

After the sensor portion 1 is knitted, the first terminal 10a and the second terminal 10b are connected to the first wire 2a and the second wire 2b by caulking, crimping, soldering or the like (wire connection step), and the first connecting portion 3a and the second connecting portion 3b are formed. As the first wire 2a and the second wire 2b, for example, an elastic electric wire (elastic electric wire) made of a metallic conductor is used. An electric wire other than the stretchable electric wire may be used as the first wire 2a and the second wire 2b. An insulating cover member or the like may be attached to the first connecting portion 3a and the second connecting portion 3b. In this example, the cover member is attached to cover the metal-exposed portion of the first connecting portion 3a and the second connecting portion 3b.

Further, the sensor portion 1 is knitted on the knit of glove 100 or the like (knitting step), the resistance detection circuit as shown in FIG. 2 is formed (circuit forming step), and the components constituting the resistance detection circuit are attached to the knit or a place other than the knit (assembling step). Through these steps, a knit product (wearable sensor) such as a glove 100A with a contact pressure sensor is manufactured.

According to the contact pressure sensor 20 of this example, between the pressing body contact surface 1m and the pressed body contact surface 1n, knitting yarn intersecting portions 5, which are portions where the knitting yarn 4 intersects, and void portions S, which are spaces where the knitting yarn 4 is not disposed, are formed. When a pressing body such as a finger M comes into contact with the pressing body contact surface 1m of the sensor portion 1 in a state in which the pressed body contact surface 1n is in contact with the pressed body N, void portions S that were initially present in large amounts are gradually reduced. In some instances (but not always), the knitting yarn 4 is crushed such that the cross section of the knitting yarn 4 deforms. As described above, between the pressing body contact surface 1m and the pressed body contact surface 1n, the contact conformation between the knitting yarns 4 changes between a state in which many void portions S are present and a state in which the void portions S are reduced and the knitting yarns 4 come into contact with each other, and thus the variation amount of the contact resistance in the CNT yarn is large. By detecting the contact resistance in the sensor portion 1 using the pressure sensor 20, the pressing force applied to the pressed body by the pressing body can be detected more accurately. The weight of the sensor portion 1 can be reduced. The structure having the knitting yarn intersecting portions 5 and the void portions S changes so that the void portions S contract when the force is received, and changes so that the void portions S expand (are restored) when the force is released. Therefore, the contact pressure sensor 20 can detect that the pressing force is applied, and can also detect that the pressing force disappears. In the contact pressure sensor 20, when the pressing force disappears (is removed), the void portions S are restored, and thus the pressing force can be detected every time the pressing force is applied.

When the contact areas change between the knitting yarns 4 including the CNT yarn, the changes are reliably reflected in the contact resistance in the sensor portion 1. Therefore, it is possible to reliably detect a change in the pressing force in the knitting yarn intersecting portions 5.

The first end portion 1a and the second end portion 1b of the sensor portion 1 include the terminals 10a and the 10b formed of the knitting yarn 4 derived from all courses. According to this configuration, even when the pressing force is applied to the vicinity of any course of the sensor portion 1 including a plurality of courses, it is possible to detect a change in the contact resistance corresponding to the pressing force. In other words, when it is assumed that a certain pressing force is applied, it is possible to reduce an error due to a position in which the contact resistance changes when the position changes in the sensor portion 1.

The contact pressure sensor 20 includes connecting portions 3a and 3b that connect terminals 10a and 10b, which are formed of knitting yarn 4 derived from all courses, to wires 2a and 2b, which form a part of a resistance detection circuit that detects contact resistance in the sensor portion. According to this configuration, the contact resistance can be detected via the wires 2a and 2b. By adjusting the position or mounting (or mounting structure) of the wires 2a and 2b, the contact pressure sensor 20 can be applied to any application, tool, device and the like.

According to the glove 100A with a contact pressure sensor, which is the knit product of this example, when the user (a wearer of the knit product) presses a part of the body against some part of an object, the pressing force can be detected. The sensor portion 1 can also serve as a heater. The sensor portion 1 exhibits constant resistance at a constant temperature. A plied yarn of three or six CNT yarns is advantageous when a sensor portion 1 is used as the heater.

In the above-described example, the sensor yarn 4 is knitted by directly supplying the knitting portion 1 made of the CNT yarn to the flat-knitting machine. However, the method of manufacturing the contact pressure sensor may be implemented as the following modification.

Figure 6A:
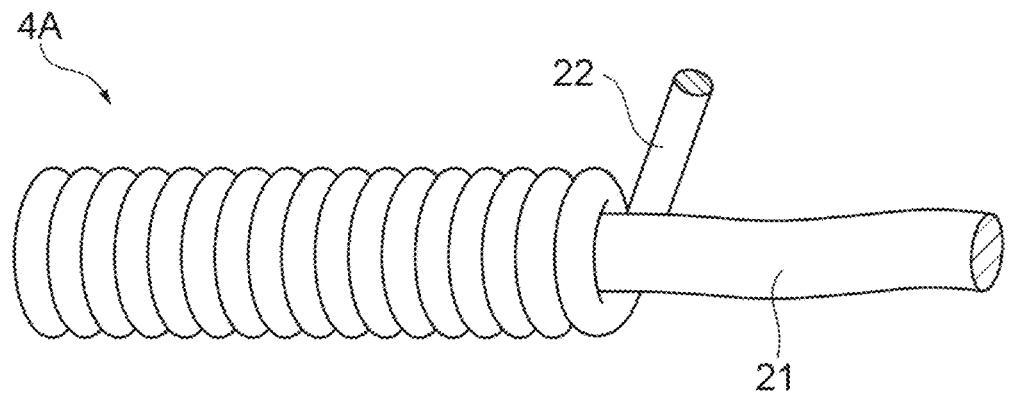
FIG. 6(a) is a view showing a yarn twisted in a twisting step.
Figure 6B:
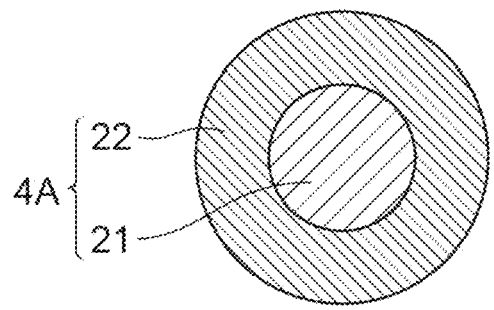
FIG. 6(b) is a cross-sectional view of the twisted yarn.
Figure 6C:
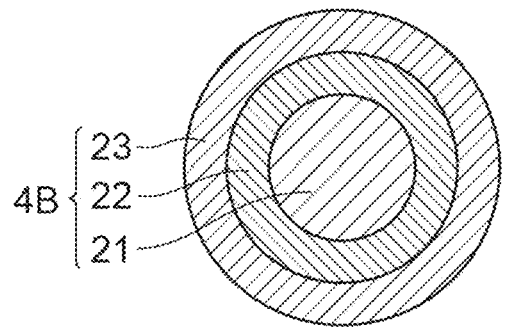
FIG. 6(c) is a cross-sectional view of another example of the twisted yarn.

In a modification, the knitting yarn 21 made of the CNT yarn is combined with the water-soluble yarn 22 before being supplied to the flat-knitting machine, and the knitting yarn 21 is covered with the water-soluble yarn 22 by twisting these yarns (see FIGS. 6(*a*) and 6(*b*)). The covering rate, which is a rate at which the surfaces of the knitting yarn 21 are covered with the water-soluble yarn 22, is preferably 100%. The number of layers in which the water-soluble yarn 22 covers the knitting yarn 21 is, for example, one as in the knitting yarn 4A shown in FIGS. 6(*a*) and 6(*b*). However, as in the knitting yarn 4B shown in FIG. 6(*c*), it is also possible to provide a double-layer cover composed of the first water soluble yarn 22 and the second water soluble yarn 23. By using the double-layer cover, the cover rate can be reliably 100%.

The CNT yarn has unique stickiness due to the van der Waals force of the CNT as a material. Due to this stickiness, the friction resistance between the yarn and the knitting needle increases during knitting, and unintended breakage of the yarn or breakage of the knitting needle may occur.

In the modified example, since the surfaces of the knitting yarn 21 are covered with the water-soluble yarn 22, the knitting yarn 21 is prevented from directly contacting the knitting needle during knitting, and the friction resistance between the yarn and the knitting needle is reduced. As a result, unintended breakage of the yarn and breakage of the knitting needle can be prevented. The sensor portion 1 knitted as the knitting yarn 21 is coated with the water-soluble yarn 22, and the water-soluble yarn can be washed away by dissolving the yarn in hot water. By washing and removing the water-soluble yarn 22, the sensor portion 1 knitted only with the knitting yarn 21 can be manufactured. Since the sensor portion obtained after the water-soluble yarn 22 is washed away and removed is knitted only by the knitting yarn 21 made of the CNT yarn, the conductive performance of the CNT can be sufficiently exhibited. Also, in the knitting yarn 4B, the sensor portion can be knitted only by the knitting yarn 21 made of the CNT yarn by washing out the first water soluble yarn 22 and the second water soluble yarn 23.

As the water-soluble yarn 22 (or water-soluble yarn 23), water-soluble vinylon made of polyvinyl alcohol is preferably used. The friction resistance between the water-soluble vinylon yarn and the knitting needle is lower than the friction resistance between the knitting yarn 21 and the knitting needle. Since the water-soluble vinylon can be removed by dissolving it in hot water (preferably at 50° C. to 60° C.) and washing it off, it is easy to handle. However, any material can be used instead of the water-soluble vinylon as long as the friction resistance with the knitting needle is lower than the friction resistance between the knitting yarn 21 and the knitting needle and the material can be dissolved in hot water and washed away.

The sensor portion knitting step in the modified example is summarized as follows.

Step 1: (Knitting yarn preparing step) The CNT yarn and the water-soluble vinylon yarn are doubled and twisted (twisting step).

Step 2: (Sensor portion knitting step) A sensor portion is formed by knitting a CNT yarn twisted by doubling and a water-soluble vinylon yarn with a flat-knitting machine. More specifically, as the sensor portion, a pressing body contact surface with which the pressing body comes into contact, a pressed body contact surface with which the pressed body comes into contact, knitting yarn intersecting portions between the pressing body contact surface and the pressed body contact surface, and void portions which are spaces between the pressing body contact surface and the pressed body contact surface and in which the knitting yarn is not disposed are formed.

Step 3: (Water-soluble yarn removal step) The formed sensor portion is dissolved in hot water, and the water-soluble vinylon is washed out and removed from the sensor portion.

Figure 7:
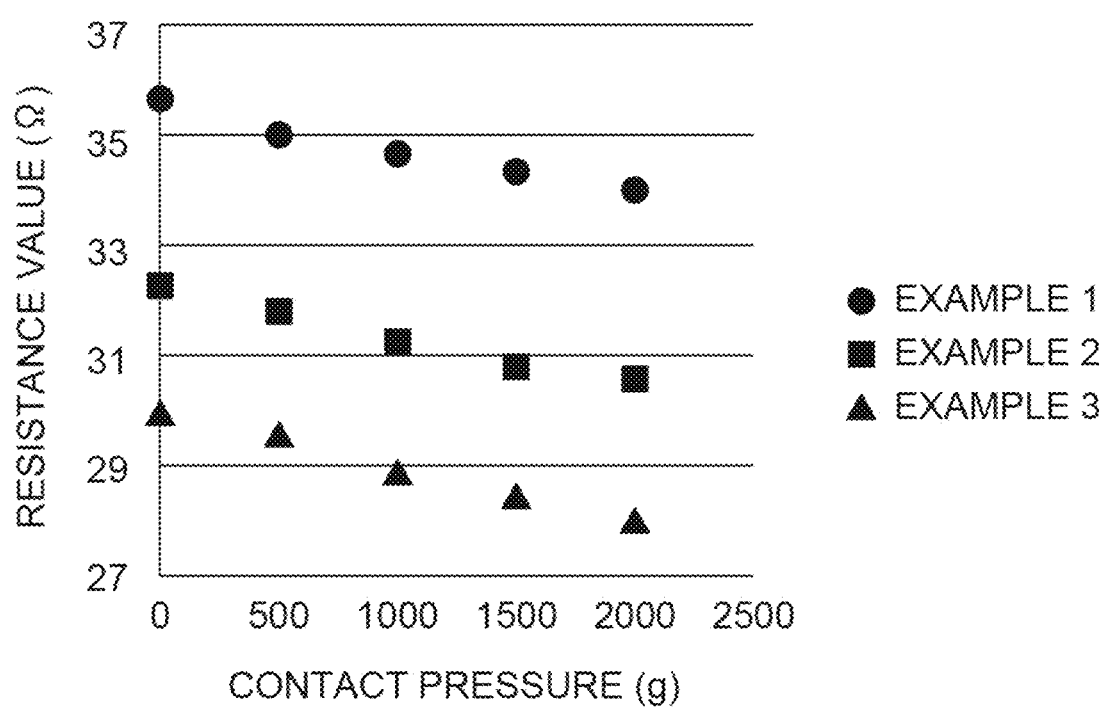
FIG. 7 is a graph showing the results of the resistance measurement test.
Figure 8B:
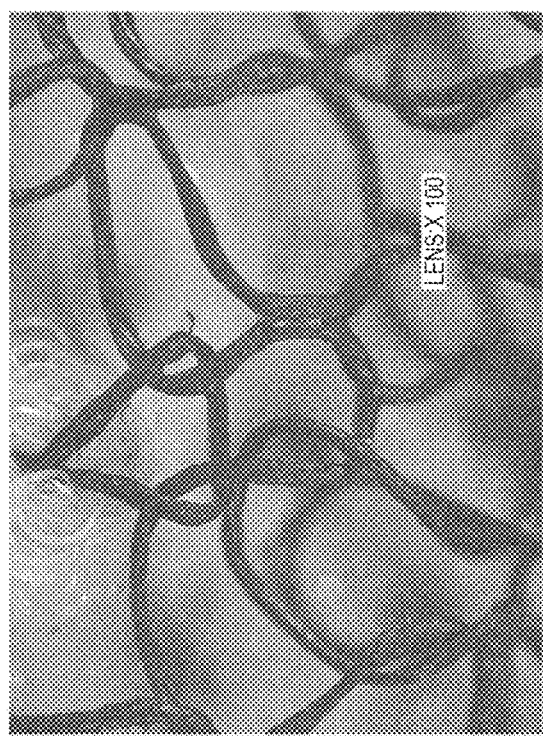
FIG. 8(b) is an enlarged photograph of the sensor portion in a pressurized state.
Figure 8A:
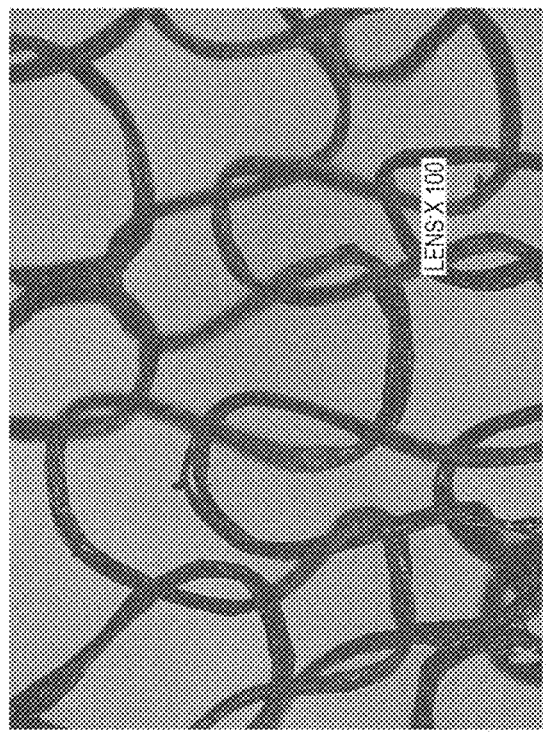
FIG. 8(a) is an enlarged photograph of the sensor portion in an unpressurized state.

Next, a measurement test of the resistance value will be described with reference to FIGS. 7 and 8(*a*)-8(*b*). A sensor portion made of a CNT knitted fabric having the same configuration as that of the above-described example was prepared, and an extendable wire was connected to the sensor portion by swaging. The sensor portion 1 was attached to the thumb underside portion 101 (see FIG. 1) of the glove 100 and the pressing force was applied to the sensor portion 1. FIG. 7 shows a change in the resistance value (Ω) with respect to the contact pressure (g) three times in each of the three types of examples. Examples 1, 2, and 3 differ in the size of the hand wearing the glove. A glove 100 was put on a small hand in Example 1, a medium hand in Example 2, and a large hand in Example 3, and measurement was performed. In each example, since the degree of tension of the glove varies depending on the size of the hand, the initial value of the resistance varies, but the change in the pressure is measured as the same tendency.

In any of Examples 1 to 3, the resistance value linearly changed without variation with respect to the change in the contact pressure, and a detection result sufficiently durable for practical use was obtained. As shown in FIG. 8(*a*), before the pressing force was applied, the knitting yarn 4 and the knitting yarn 4 were separated from each other and many void portions S were observed, but as shown in FIG. 8(*b*), when the pressing force was applied and the sensor portion 1 was compressed, the contact between the knitting yarn 4 and the knitting yarn 4 increased and the void portions S decreased. FIGS. 8(*a*) and 8(*b*) are images obtained by capturing the same portion of the sensor portion 1 from the same planar view direction as that shown in FIG. 3.

Figure 9:
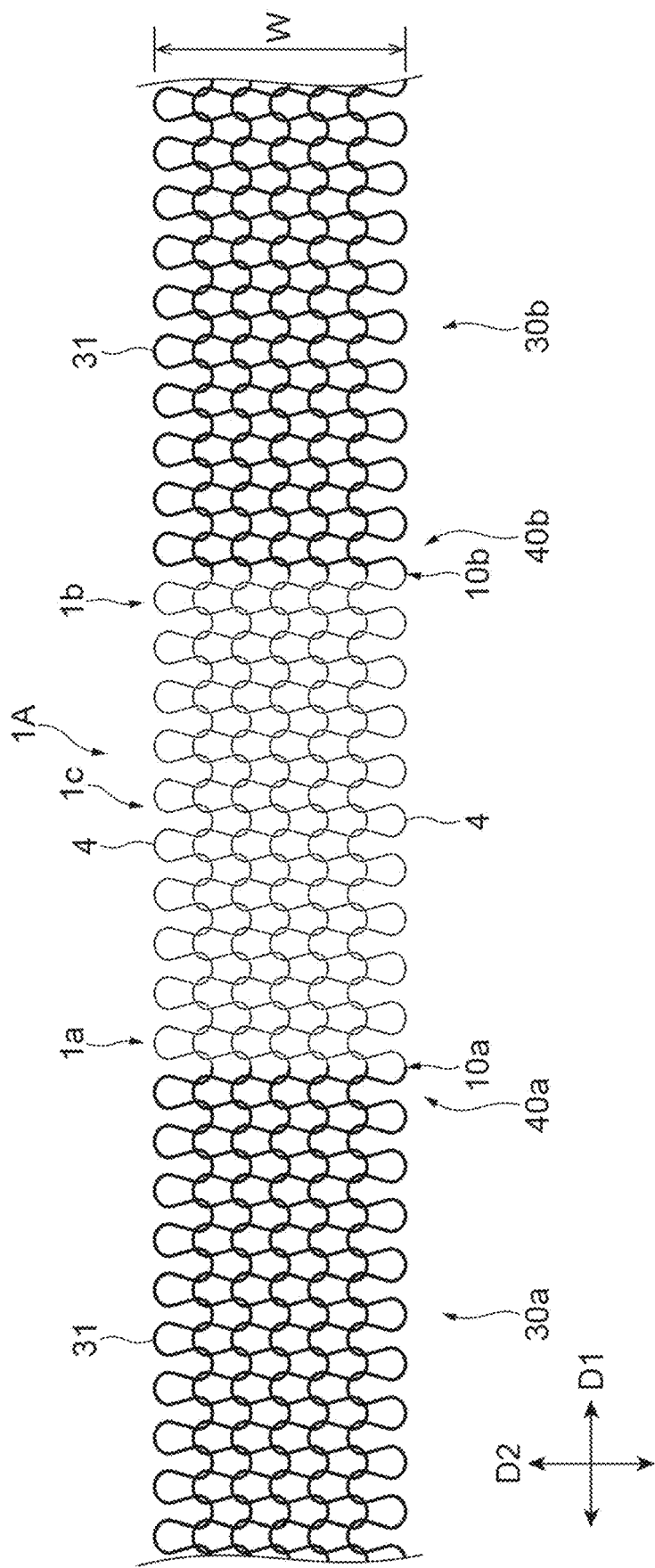
FIG. 9 shows a variation of the wires and connecting portions.

The wire can be configured differently from the above-described example. For example, as shown in an image diagram of FIG. 9, a sensor portion 1A may be provided which includes a knitted fabric wires 30a and 30b formed by knitting a conductive yarn 31 having a smaller change in the resistance value other than the CNT yarn. The change in the resistance value of the knitted fabric wires 30a and 30b is smaller than the change in the resistance value of the knitting yarn 4. The lengths of the knitted fabric wires 30a and 30b, i. e., the lengths in the wale direction D2, are substantially equal to the Width W of the knitted fabric portion 1c, but may be different from the Width W of the knitted fabric portion 1c. To be specific, with respect to the first terminal 10a and the second terminal 10b of sensor portion 1A, the first connecting portion 40a and the second connecting portion 40b are formed by, for example, method for knitting intarsia pattern. According to this configuration, a change in contact resistance occurring in the sensor portion 1A can be detected with high sensitivity via the knitted fabric wires 30a and 30b.

Although an example has been described above, this disclosure is not limited to the above example. For example, the position, size, and shape at which the sensor portion is knitted on the knit knitted using the non-conductive yarn may take any examples other than the above-described example. This disclosure may be applied in any form as long as the pressing force applied to the pressed body by the pressing body is detected through the sensor portion. The sensor portion may be attached to a portion corresponding to an underside of a finger in the glove, or may be attached to the palm portion 102 or the back portion 103. The sensor portion may be attached to the knit other than the glove. The contact pressure sensor of this disclosure may be applied to a finger stall or to a sock or a shoe.

Figure 10:
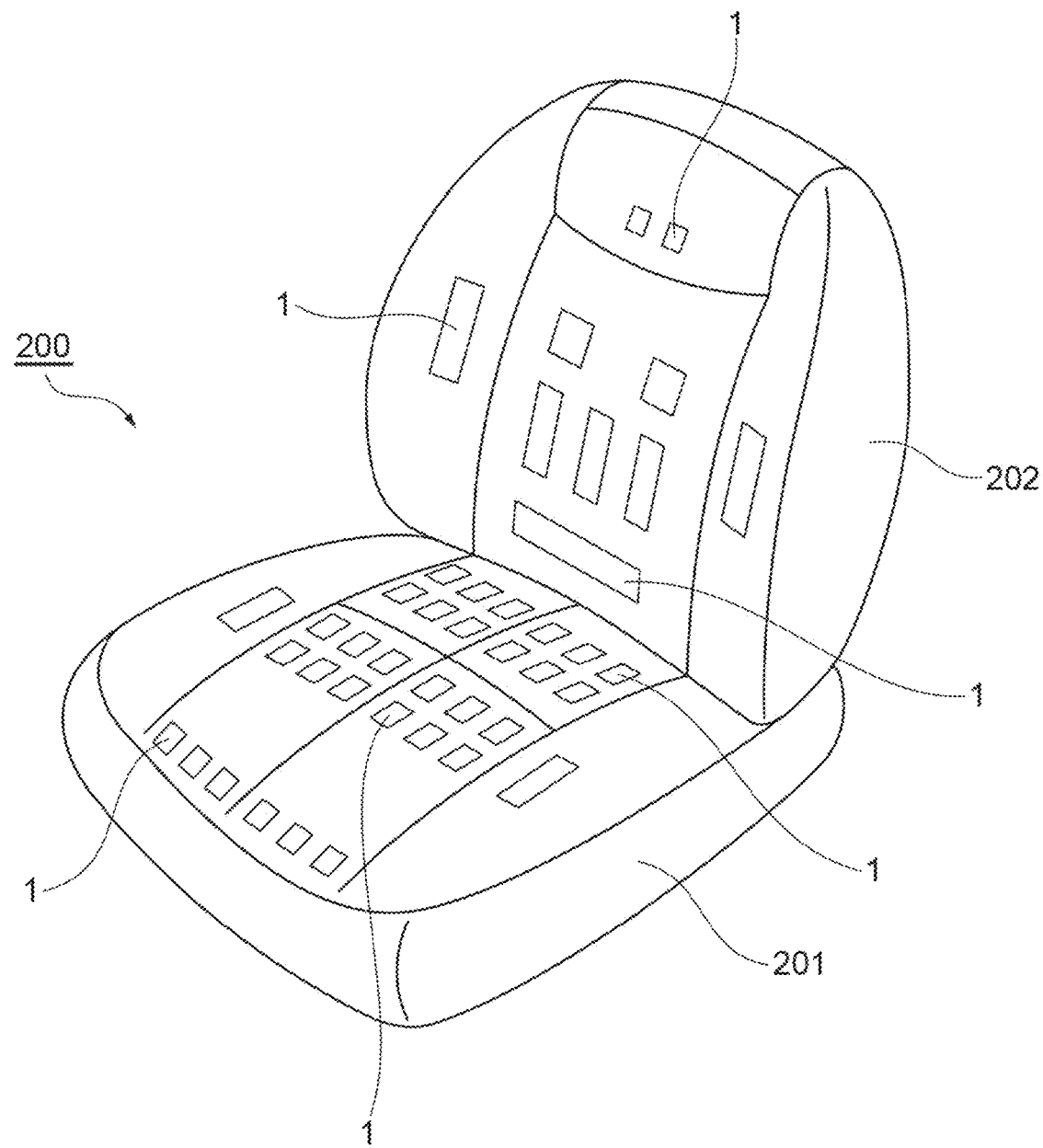
FIG. 10 is a diagram illustrating an example of application when the contact pressure sensor is applied to the seat cover.

For example, as shown in FIG. 10, an example may be provided in which a plurality of sensor portion 1 are knitted into a seat cover 200 covering a vehicle seat. By arranging a plurality of sensor portion 1 at prescribed positions of the seat portion 201 and arranging a plurality of sensor portion 1 at prescribed positions of the backrest 202, a seat pressure distribution and a backrest pressure distribution can be detected and measured. From the viewpoint of detecting and measuring such a seat pressure distribution or a pressure distribution, for example, a contact pressure sensor 20 and a sensor portion 1 may be applied to a seat surface of a toilet seat or a wheel chair in addition to the seat cover 200. In the above-described example, the plurality of sensor portion 1 are knitted onto the seat cover 200 covering the vehicle seat, but the plurality of sensor portion 1 may be knitted directly onto the vehicle seat. By directly knitting the plurality of sensor portion 1 onto the vehicle seat, positional deviation between the plurality of sensor portion 1 and the vehicle seat can be prevented, and the seat pressure distribution and the backrest pressure distribution can be detected and measured with high accuracy.

The pressing force received by the knitted fabric portion 1 of the sensor portion 1c from the pressing body is not limited to a force in the thickness direction of the knitted fabric portion 1c, that is, in a direction orthogonal to both the course direction D1 and the wale direction D2, and may be a force in a direction intersecting both the course direction D1 and the wale direction D2 at an angle other than 90°.

The first end portion and the second end portion of the sensor portion to which the wire is connected are not limited to both end portions in the course direction. The first end portion and the second end portion may be both ends in the wale direction of the sensor portion. The first end portion and the second end portion are not limited to when each of the first end portion and the second end portion includes a terminal formed of a knitting yarn derived from all courses of the sensor portion, but may include a terminal formed of a knitting yarn derived from a plurality of partial courses of the sensor portion.

Another knitted fabric may be formed on the outside of the pressing body contact surface of the knitted fabric portion of the sensor portion (the outside of the peripheral edge portion in the course direction D1 and/or the wale direction D2) or the outside of the pressed body contact surface (the outside of the peripheral edge portion in the course direction D1 and/or the wale direction D2), or a protective film or the like may be attached thereto in a subsequent step. As a result, the influence of moisture such as sweat can be prevented, and durability can be improved. The examples are not limited to an aspect in which the pressing body contact surface or the pressed body contact surface directly contacts the pressing body or the pressed body. An example in which the pressing body contact surface or the pressed body contact surface indirectly contacts the pressing body or the pressed body is also included in this disclosure.

The invention claimed is:

1. A contact pressure sensor that detects a pressing force applied to a pressed body by a pressing body through a sensor portion disposed between the pressing body and the pressed body,
   wherein the sensor portion is formed of a knitting yarn including a carbon nanotube yarn, and
   the sensor portion comprises:
   a pressing body contact surface with which the pressing body comes into contact;
   a pressed body contact surface with which the pressed body comes into contact;
   knitting yarn intersecting portions formed between the pressing body contact surface and the pressed body contact surface; and
   void portions formed between the pressing body contact surface and the pressed body contact surface, the void portions being spaces in which the knitting yarn is not disposed;
   wherein a first end portion and a second end portion, which are both ends of the sensor portion in a course direction, each includes a terminal formed of the knitting yarn derived from a plurality of courses of the sensor portion.

2. The contact pressure sensor according to claim 1, wherein the sensor portion is configured to change a contact resistance in the sensor portion by changing a contact area between the knitting yarn in response to a change in the pressing force in the knitting yarn intersecting portions when the sensor portion receives a force from a direction intersecting both a course direction and a wale direction or when the received force is released.

3. The contact pressure sensor according to claim 2, wherein a first end portion and a second end portion, which are both ends of the sensor portion in a course direction, each includes a terminal formed of the knitting yarn derived from a plurality of courses of the sensor portion.

4. A knit product comprising:
   the contact pressure sensor according to claim 3; and
   a knit knitted using a non-conductive yarn, wherein the sensor portion is integrally knitted thereon.

5. A knit product comprising:
   the contact pressure sensor according to claim 2; and
   a knit knitted using a non-conductive yarn, wherein the sensor portion is integrally knitted thereon.

6. The contact pressure sensor according to claim 1, further comprising a connecting portion that connects the terminal including the knitting yarn derived from the plurality of courses to a wire that forms a part of a resistance detection circuit for detecting contact resistance in the sensor portion.

7. A knit product comprising:
the contact pressure sensor according to claim 6; and
a knit knitted using a non-conductive yarn, wherein the sensor portion is integrally knitted thereon.

8. The contact pressure sensor according to claim 6, wherein the wire is a knitted fabric wire formed by knitting a conductive yarn having a smaller change in resistance value than that of the knitting yarn.

9. A knit product comprising:
the contact pressure sensor according to claim 8; and
a knit knitted using a non-conductive yarn, wherein the sensor portion is integrally knitted thereon.

10. A knit product comprising:
the contact pressure sensor according to claim 1; and
a knit knitted using a non-conductive yarn, wherein the sensor portion is integrally knitted thereon.

11. A method of manufacturing a contact pressure sensor that detects a pressing force applied to a pressed body by a pressing body through a sensor portion disposed between the pressing body and the pressed body, the method comprising:
a sensor portion knitting step of knitting the sensor portion using a knitting yarn including a carbon nanotube yarn,
wherein the sensor portion knitting step includes:
forming a pressing body contact surface with which the pressing body comes into contact, a pressed body contact surface with which the pressed body comes in contact, knitting yarn intersecting portions between the pressing body contact surface and the pressed body contact surface, and void portions which are spaces between the pressing body contact surface and the pressed body contact surface and in which the knitting yarn is not disposed;
wherein, in the sensor portion knitting step, the sensor portion is knitted such that a first end portion and a second end portion, which are both ends of the sensor portion in a course direction, each includes a terminal formed of the knitting yarn derived from a plurality of courses of the sensor portion.

12. The method according to claim 11, further comprising a knitting yarn preparing step of preparing a knitting yarn including the carbon nanotube yarn before the sensor portion knitting step,
wherein the knitting yarn preparing step includes a twisting step of twisting the carbon nanotube yarn and a water-soluble yarn, and in the twisting step, the surface of the carbon nanotube yarn is covered with the water-soluble yarn.

13. The method according to claim 12, further comprising a water-soluble yarn removing step of washing the sensor portion with hot water after the sensor portion knitting step to dissolve and remove the water-soluble yarn from the sensor portion.

14. The method according to claim 13, wherein the water-soluble yarn is water-soluble vinylon.

15. The method according to claim 13, wherein, in the sensor portion knitting step, the sensor portion is knitted such that a first end portion and a second end portion, which are both ends of the sensor portion in a course direction, each includes a terminal formed of the knitting yarn derived from a plurality of courses of the sensor portion.

16. The method according to claim 12, wherein, in the sensor portion knitting step, the sensor portion is knitted such that a first end portion and a second end portion, which are both ends of the sensor portion in a course direction, each includes a terminal formed of the knitting yarn derived from a plurality of courses of the sensor portion.

17. The method according to claim 11, further comprising a wire connecting step of connecting the terminal of each of the first end portion and the second end portion formed in the sensor portion knitting step to a wire forming a part of a resistance detection circuit for detecting contact resistance in the sensor portion.

18. A method of manufacturing a contact pressure sensor that detects a pressing force applied to a pressed body by a pressing body through a sensor portion disposed between the pressing body and the pressed body, the method comprising:
a knitting yarn preparing step of preparing a knitting yarn including the carbon nanotube yarn; and
a sensor portion knitting step of knitting the sensor portion using the knitting yarn including a carbon nanotube yarn,
wherein the sensor portion knitting step includes:
forming a pressing body contact surface with which the pressing body comes into contact, a pressed body contact surface with which the pressed body comes in contact, knitting yarn intersecting portions between the pressing body contact surface and the pressed body contact surface, and void portions which are spaces between the pressing body contact surface and the pressed body contact surface and in which the knitting yarn is not disposed;
wherein the knitting yarn preparing step includes a twisting step of twisting the carbon nanotube yarn and a water-soluble yarn, and in the twisting step, the surface of the carbon nanotube yarn is covered with the water-soluble yarn.

\* \* \* \* \*